F. H. PAGE.
ATTACHMENT DEVICE FOR CONNECTION OF TENSION WIRES TO AIRCRAFT SPARS.
APPLICATION FILED JULY 7, 1919.

1,314,536.

Patented Sept. 2, 1919.
3 SHEETS—SHEET 3.

UNITED STATES PATENT OFFICE.

FREDERICK HANDLEY PAGE, OF LONDON, ENGLAND.

ATTACHMENT DEVICE FOR CONNECTION OF TENSION-WIRES TO AIRCRAFT-SPARS.

1,314,536.  Specification of Letters Patent.  Patented Sept. 2, 1919.

Application filed July 7, 1919. Serial No. 309,150.

*To all whom it may concern:*

Be it known that I, FREDERICK HANDLEY PAGE, a subject of the King of Great Britain, residing at London, England, have invented certain new and useful Improvements in Attachment Devices for Connection of Tension-Wires to Aircraft-Spars, of which the following is a specification.

This invention relates to an improved means of connecting tension-wires to the spars of aircraft.

In carrying out this invention the spar or like member, hereinafter termed spar, is pierced transversely through its neutral axis to receive a tubular bush to which the ends of tension-wires are attached by being passed through apertures in the walls of the bush and secured therein.

The tubular bush is inserted into a hole drilled transversely through the spar on its neutral axis and may project on either side beyond the faces of the spar. The walls of these projecting parts of the tubular bush are perforated to receive bracing-wires or their tightening means which pierce the bush radially. Bracing-wires may also be fixed on to the center or middle portion of the bush, suitable holes being drilled in the spar to allow passage of the wires or tension device.

To each side of the spar, plates of metal, ply-wood or the like are fixed and these plates are formed with holes into which the ends of the tubular bush project and the said plates may be extended below the lower edge of the spar and serve to support a plate to receive the thrust of a strut on the underside of the spar. Rigidly attached to these plates and extending beneath the spar is a U-shaped bracket provided with means of attachment for the incidence bracing-wires and also for the attachment of a strut to the spar.

The tubular bush may contain segmentally-shaped pieces formed with sockets to receive the ends of the bracing-wires or tensioning devices which may be screw-threaded into the said sockets.

If desired further sets of bracing-wires may be arranged, for instance to take the drift-bracings lying in the plane of the supporting wings of the aircraft.

Figure 1:
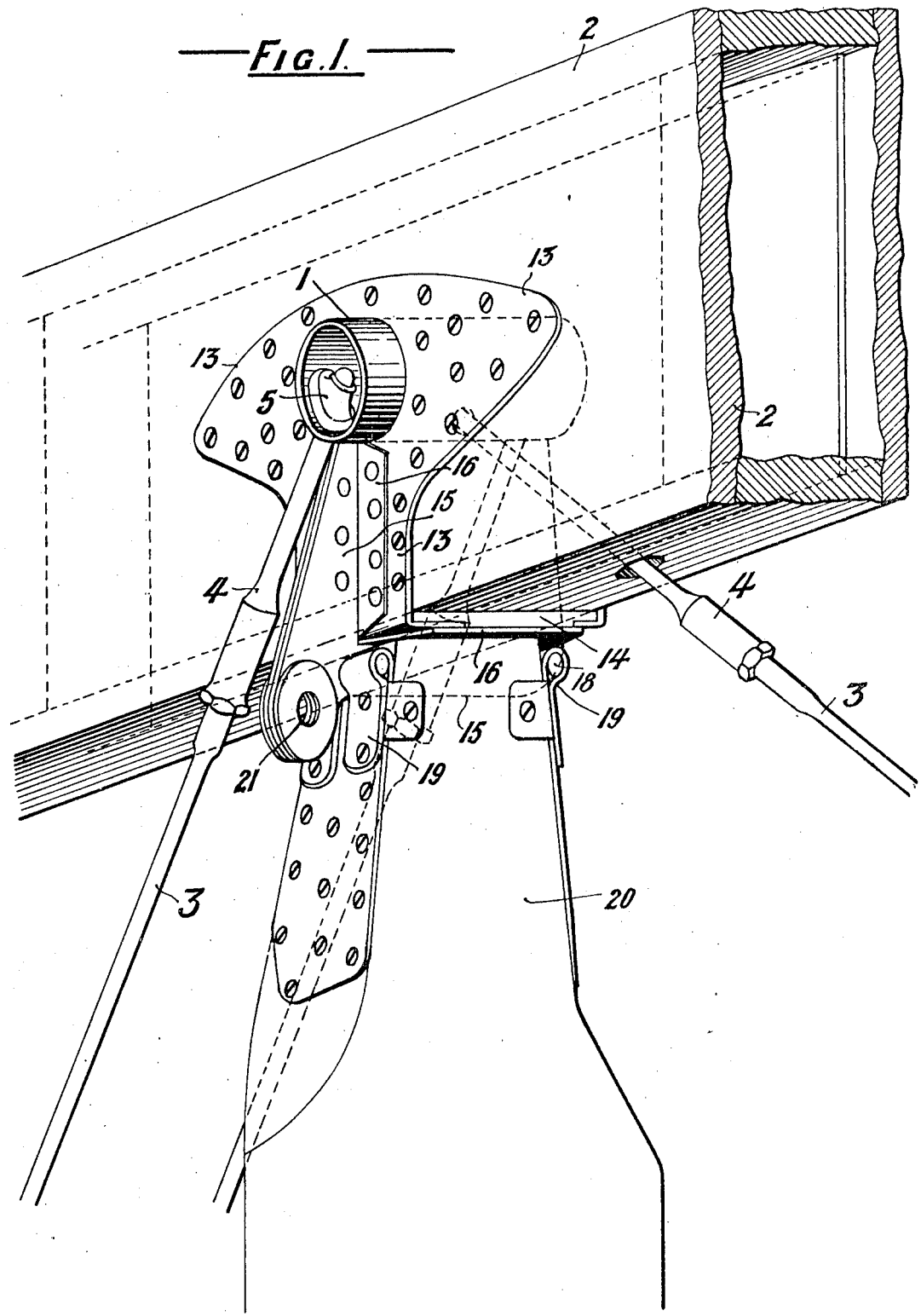
Figure 2:
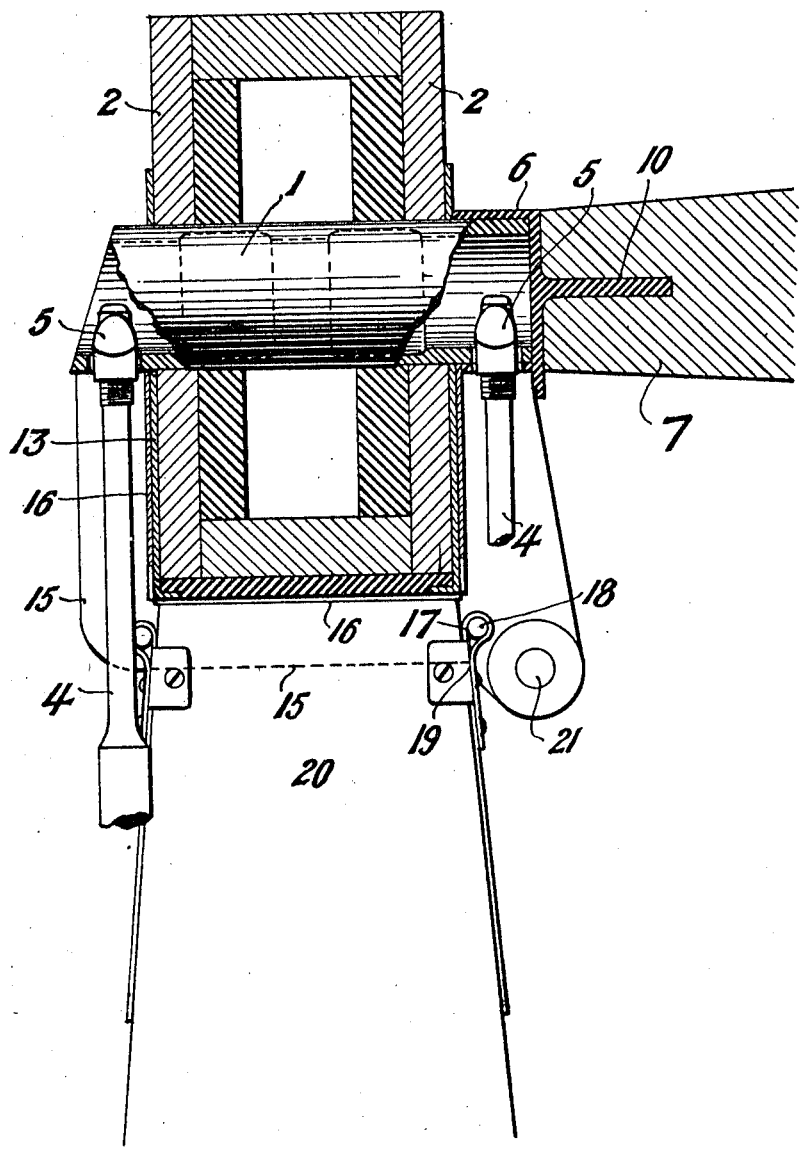
Figure 3:
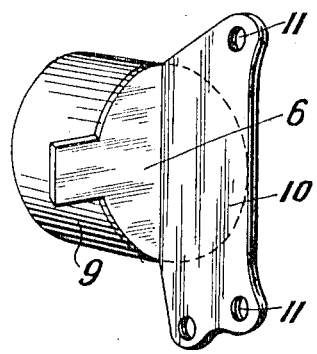
Figure 4:
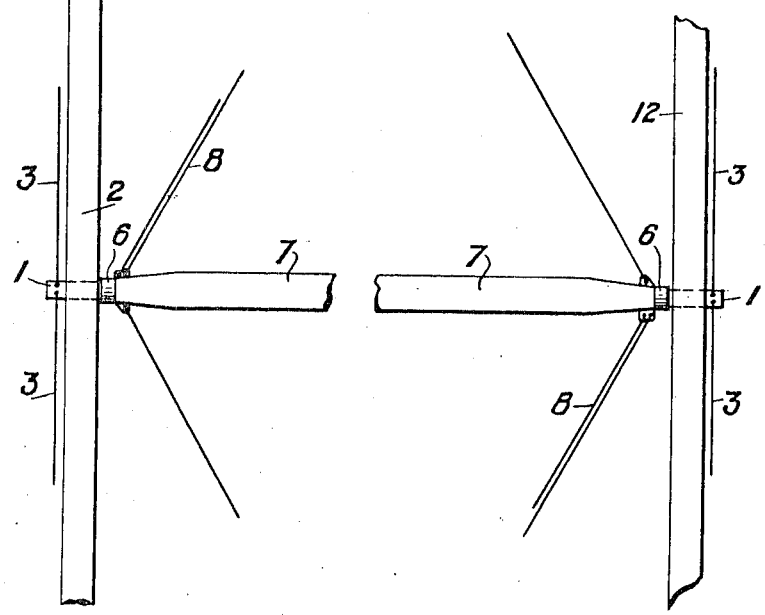

Referring now to the accompanying drawings, Figure 1 is a perspective view of a spar provided with the attachment device having tension-wires connected therewith according to this invention, Fig. 2 is a transverse section of the same device and spar, Fig. 3 is a detail view of a cap to be fitted to the ends of the tubular bush, and Fig. 4 a plan view on a smaller scale of a part of a wing-frame showing the drift bracing-wires connected to the ends of the before mentioned tubular bush.

The tubular bush 1 is passed through a hole drilled transversely through the spar 2 on its neutral axis, said bush having its ends projecting on either side beyond the walls thereof.

The walls of the projecting ends of the bush 1 are perforated to receive the ends of the tensioning devices 4 of the bracing-wires 3 which pass through the walls of the bush 1 radially and are secured in position by segmental seats 5 each formed with a socket to receive the end of the tensioning device 4, such seats 5 being placed within the bush 1 and in contact with the interior walls thereof.

As shown at Fig. 1, one of the tension devices of a bracing-wire pierces the central portion of the tubular bush a suitable hole being drilled in the spar to allow passage for the said tension device.

A cap 6 shown separately at Fig. 3 is affixed to the end of the bush 1 where necessary, to receive, for instance, a drift-strut 7 and drift bracing-wires 8 as shown at Fig. 4. The cap 6 comprises a tubular portion 9 adapted to fit over the projecting end of the bush 1 and an outstanding fin or projection 10 having suitable holes 11 for the attachment thereto of bracing-wires 8, the said fin also receiving the slotted end of a strut 7 as shown at Figs. 2 and 4.

In Fig. 4 a cap 6 is shown placed on the inner end of the brush 1 of the front spar 2 and similarly on the inner end of the bush 1 of the rear spar 12 to receive the drift-wires 8 and the ends of the drift-strut 7.

Fixed to the walls of the spar around the projecting ends of the tubular bush 1 are plates 13, such plates extending downward slightly below the edge of the spar and supporting a thrust-plate 14 beneath the spar and to these plates 13 a U-shaped bracket 15 is rigidly attached.

The bracket 15 projects at right angles from plates 13 on each side of the spar and passes beneath the plate 14 where it projects downwardly at right angles to the said plate, and it is also provided with flanges 16 by which it is secured to the plates 13 and 14.

This bracket 15 is formed with holes 17 to receive bolts 18 which engage sockets 19 carried on a strut 20 for the attachment of the said strut to the spar 2, and on one side of the spar the outstanding portion of the bracket is slightly extended and forms an eye 21 for receiving the incidence bracing-wires. The bracket 15 is suitably formed of two plates with opposite flanges 16 bent at right angles for attachment to the plate 13.

What I claim as my invention and desire to secure by Letters Patent is:—

1. In attachment devices for use in aircraft construction; a tubular bush extending transversely through the neutral axis of a spar, its walls having apertures therein for receiving tension-members the ends of which pass through the said apertures and are secured to seats supported interiorly of the walls of the tubular bush.

2. In attachment devices for use in aircraft construction; a tubular bush extendin transversely through the neutral axis of a spar, its ends projecting beyond the faces of the spar, said ends having apertures in the walls thereof to receive tension-members the ends of which pass through the said apertures and are secured to seats supported interiorly of the walls of the tubular bush.

3. In attachment devices for use in aircraft construction; a tubular bush extending transversely through the neutral axis of a spar, its ends projecting beyond the faces of the spar or strut, apertures in the walls of said tubular bush, a cap fitting the projecting end thereof and provided exteriorly with a projecting fin capable of receiving the end of a rigid member such as the slotted end of a strut.

4. In attachment devices for use in aircraft construction; a tubular bush extending transversely through the neutral axis of a spar, its ends projecting beyond the faces of the spar, apertures in the walls of said tubular bush, a cap fitting the projecting ends thereof provided exteriorly with a projecting fin having holes therein for the attachment of tension-members.

5. In attachment devices for use in aircraft construction; a tubular bush extending transversely through the neutral axis of a spar, its ends projecting beyond the faces of the spar, apertures in the walls of the said bush to receive tension-members, plates secured to the side faces of the spar and embracing the projecting ends of the tubular bush and supporting at their lower ends a plate in contact with the underside of the spar.

6. In attachment devices for use in air craft construction; a tubular bush extending transversely through the neutral axis of a spar, apertures in the walls of the said bush to receive tension members, plates secured to the side faces of the spar and a U-shaped bracket secured to the said plates, said bracket comprising an outstanding flange provided with means for receiving a rigid member such as the slotted end of a strut and being formed with holes to receive tension-members.

In witness whereof I have hereunto set my hand in the presence of two witnesses.

FREDERICK HANDLEY PAGE.

Witnesses:
GRIFFITH BREWER,
CYRIL GRIFFITH BREWER.